United States Patent
Stowell et al.

(10) Patent No.: US 10,379,968 B2
(45) Date of Patent: Aug. 13, 2019

(54) BACKUP AND RESTORE FRAMEWORK FOR DISTRIBUTED COMPUTING SYSTEMS

(71) Applicant: Pivotal Software, Inc., San Francisco, CA (US)

(72) Inventors: Therese Louise Stowell, London (GB); Kalyan Chakravarthy Dudala, San Francisco, CA (US); Colin Michael Humphreys, London (GB); Simon James Jones, London (GB); Jatin Naik, London (GB); Alvaro Perez-Shirley, San Francisco, CA (US); Henry Arthur James Stanley, London (GB)

(73) Assignee: Pivotal Software, Inc., San Francisco, CA (US)

( * ) Notice: Subject to any disclaimer, the term of this patent is extended or adjusted under 35 U.S.C. 154(b) by 94 days.

(21) Appl. No.: 15/588,529

(22) Filed: May 5, 2017

(65) Prior Publication Data
US 2018/0322019 A1 Nov. 8, 2018

(51) Int. Cl.
*G06F 11/14* (2006.01)
*G06F 9/48* (2006.01)

(52) U.S. Cl.
CPC ........ *G06F 11/1469* (2013.01); *G06F 9/4843* (2013.01); *G06F 11/1451* (2013.01); *G06F 11/1458* (2013.01); *G06F 2201/805* (2013.01); *G06F 2201/82* (2013.01)

(58) Field of Classification Search
CPC .............................. G06F 11/14; G06F 11/1469
USPC ......................................................... 714/19
See application file for complete search history.

(56) References Cited

U.S. PATENT DOCUMENTS

| 8,316,349 | B2* | 11/2012 | Morozov | G06F 8/30 717/113 |
| 8,914,329 | B1* | 12/2014 | Chandra | G06F 11/263 707/654 |
| 2004/0267839 | A1* | 12/2004 | Mendonca | G06F 11/1464 |

(Continued)

OTHER PUBLICATIONS

International Search Report and Written Opinion issued in International Application No. PCT/US2018/029989, dated Aug. 22, 2018, 13 pages.

*Primary Examiner* — Kamini B Patel
(74) *Attorney, Agent, or Firm* — Fish & Richardson P.C.

(57) ABSTRACT

Methods, systems, and computer readable media for backing up and restore a deployment on a cloud computing platform are described. A deployment on a cloud computing platform includes a set of virtual machines and corresponding disks. A deployment may include multiple subunits designated as deployment jobs. A respective job specification file specifies respective resources used by each deployment job. The resources include various scripts specifying actions to take before, during, and after a backup. A backup orchestrator, upon receiving a backup request for the deployment, executes the scripts in a pre-specified sequence ordered by script type. When a particular type of scripts executes, the corresponding script for each deployment job, if specified in the specification file to correspond to that type, executes. When all scripts of a particular type finish execution, scripts having a next type execute. Accordingly, the operations of backing up multiple deployment jobs are synchronized and orchestrated.

19 Claims, 5 Drawing Sheets

(56) References Cited

U.S. PATENT DOCUMENTS

| | | | |
|---|---|---|---|
| 2010/0242032 A1* | 9/2010 | Ladki | G06F 8/71 |
| | | | 717/171 |
| 2012/0266156 A1 | 10/2012 | Spivak et al. | |
| 2013/0232463 A1* | 9/2013 | Nagaraja | G06F 8/61 |
| | | | 717/101 |
| 2016/0110227 A1* | 4/2016 | Ono | G06F 9/5083 |
| | | | 718/1 |
| 2016/0197850 A1* | 7/2016 | Peng | H04L 41/5003 |
| | | | 709/226 |
| 2017/0052776 A1* | 2/2017 | Kotian | G06F 8/65 |
| 2018/0260201 A1* | 9/2018 | Liu | G06F 8/61 |

* cited by examiner

BACKUP AND RESTORE FRAMEWORK FOR DISTRIBUTED COMPUTING SYSTEMS

BACKGROUND

This specification generally relates to cloud computing techniques.

In cloud computing, a set of shared computing resources, storage resources, and network resources can be provisioned to users, generally in the form of virtual machines. Multiple physical computing appliances, e.g., computers in a server farm, can provide a service platform for provisioning these resources. The service platform is sometimes referred to as infrastructure as a service (IaaS). A deployment system can automate and simplify transforming a source code or binary code representation of an application into a service instance of that application using IaaS resources. The service instance can then be accessed by end users on a cloud computing platform. An example of a cloud computing platform is a Pivotal Cloud Foundry® software product deployed on a set of cloud appliances. An example deployment system is a BOSH® system that deploys and manages service instances on a cloud computing platform.

SUMMARY

This specification describes methods, systems, and computer-readable media for backing up and restoring a deployment on a cloud computing platform. A deployment on a cloud computing platform is a set of virtual machines and corresponding non-transitory storage devices, e.g., disks. A deployment may include multiple subunits designated as deployment jobs. A respective job specification file specifies respective resources used by each deployment job. The resources include various scripts specifying actions to perform before, during, and after a backup or restore operation. A backup orchestrator, upon receiving a backup or restore request for the deployment, executes the scripts in a pre-specified sequence ordered by script type, for the deployment jobs. When a particular type of scripts executes, the corresponding script for each deployment job corresponding to that type executes. When all scripts of a particular type finish execution, scripts having a next type execute. Accordingly, the backup and restore processes of multiple deployment jobs are synchronized and orchestrated.

Particular embodiments of the subject matter described in this specification can be implemented to realize one or more of the following advantages. The disclosed techniques can provide a simple command line interface for backing up and restoring large deployments on a large distributed computing system. The backup and restore processes on large systems running multiple jobs in parallel can be inherently complex. The disclosed techniques provide a framework that simplifies the complex process by delegating the actions of backup and restore to each deployment job. Compared to conventional techniques for backing up and restoring deployments, the techniques described in this specification provide more flexible backup and restore. The disclosed techniques orchestrate the backup and restore operations of the multiple jobs, thereby preventing conflicts caused by different jobs locking up at different times and ensuring the subcomponents of the system are paused in a consistent state before a backup is taken. Accordingly, compared to conventional backup systems, the disclosed techniques are more suitable for large deployments with multiple subcomponents.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
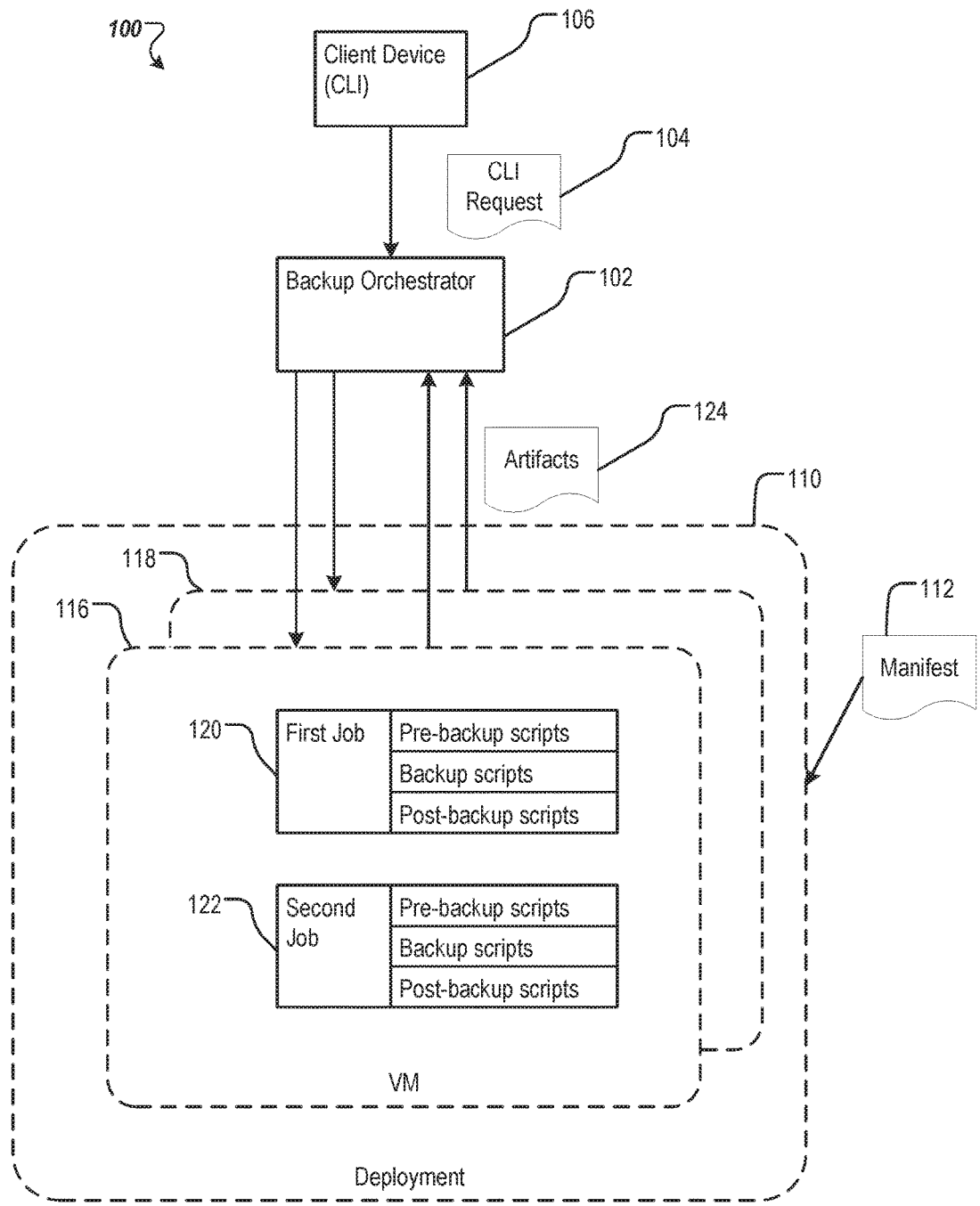
FIG. 1 is a block diagram illustrating an architecture of an example system implementing a backup and restore framework.

FIG. 1 is a block diagram illustrating an architecture of an example system implementing a backup and restore framework. A backup orchestrator 102 receives a backup request 104 from a client device 106 to backup a deployment 110. The backup orchestrator 102 includes one or more computers executing one or more programs performing the backup or restore. The backup request 104 can include a command line input invoking the one or more programs. The backup request 104 can identify the deployment 110 explicitly or implicitly. For example, the backup request 104 can specify one or more parameters, e.g., a name of the deployment, a network path of the deployment, or both. The client device 106 can include a command line interface (CLI) configured to receive a command line input. A backup operation includes dumping data that can be used to recreate the deployment 110 to a non-transitory storage device. A restore operation includes recreating the deployment 110 from previously dumped data.

The deployment 110 includes a collection of virtual machines (VMs) and persistent storage devices, e.g., disks. The VMs are built from a stemcell, which includes an operating system image wrapped in an IaaS-specific package that includes one or more utilities and configuration files. The VMs of the deployment are populated with specific releases of software based on a deployment manifest 112 and managed by a deployment director, e.g., a BOSH Director. Each release includes a versioned collection of configuration properties, configuration templates, scripts, source code, and binary artifacts. The deployment manifest 112 is a file that specifies versions of stemcells, releases, and resources to be used by each release.

The deployment 110 includes multiple deployment jobs, logically grouped into instance groups, e.g., instance groups 116 and 118. Each of the instance groups 116 and 118 can include one or more instances, e.g., VMs, spanning across multiple availability zones. Each of the instance groups, e.g., the instance group 116, can include one or more deployment jobs, e.g., deployment jobs 120 and 122. Each deployment job is a logical unit of a deployment that represents a long running service or a short running task, also referred to as an errand. Each of the deployment jobs 120 and 122 is defined in the deployment manifest 112. Each of the deployment jobs 120 and 122 can include metadata, one or more configuration files, and one or more scripts. A job specification file, e.g., a BOSH spec file, can define the metadata, including, for example, job name, job description, templates, and locations of scripts associated with the job. The deployment manifest 112 can specify, for each of the deployment jobs 120 and 122, a respective job name, one or more respective job templates, a respective resource pool, one or more respective networks, and one or more backup or restore scripts. The backup or restore scripts perform preparation and cleanup actions for the backup and restore operations.

For example, the deployment manifest 112 specifies that a first deployment job 120 is associated with a first pre-backup script, a first backup script, and a first post-backup script. The deployment manifest 112 specifies that a second deployment job 122 is associated with a second pre-backup script, a second backup script, and a second post-backup script. Each script can be created by a release author. Each script can be a regular shell script. ERB (Embedded RuBy) tags may be used in each script for templating.

Each script defines respective operations to perform at each particular stage of the backup or restore. A backup can include multiple tasks performed at multiple stages. The tasks and corresponding stages can include, for example, pre-backup check for determining whether a particular deployment job is backupable, e.g., is suitable for backup; pre-backup lock that stops a deployment job from being modified and going out of synchronization; backup that dumps, e.g., writes, data of the deployment job; post-backup unlock that allows the deployment job to be modified; and post-backup cleanup that saves artifacts. The stages in a restore can include, for example, pre-restore check, restore lock, restore, restore unlock, restore validate, and restore cleanup. These tasks are provided as examples. The tasks at each stage can be user configurable, to perform any action that a release author desires.

For each of the first deployment job 120 and the second deployment job 122, each stage can correspond to a respective script. Each deployment job does not necessarily have scripts for all stages. Scripts for all jobs corresponding to a particular stage can be stored together in a directory, e.g., /var/vcap/jobs/[job name]/bin/backup or /var/vcap/jobs/[job name]/bin/restore. One or more specification files for deployment jobs in a release can specify the respective directories for the stages.

Upon receiving the backup request 104, the backup orchestrator 102 locates the scripts associated with the deployment jobs 120 and 122 and executes the scripts. The backup orchestrator 102 is configured to execute the scripts stage-by-stage. For example, the backup orchestrator 102 can execute scripts of pre-backup check stage for all deployment jobs before executing pre-backup lock scripts. Within each stage, the backup orchestrator 102 may or may not execute the scripts for all deployment jobs in a specific order. The scripts may generate one or more artifacts 124. Each artifact 124 can include information about the backup, e.g., a version of the backup. The backup orchestrator 102 can collect and store the artifacts or provide the artifacts to the client device 106. The backup orchestrator 102 can generate a response to the client device 106 to report status of the backup.

In general, the backup orchestrator 102 provides a common user interface for specifying and invoking backup operations and for configuring a common backup destination. For convenience, the operations of the backup orchestrator 102 are described above generally in terms of backup. The restore process is similar.

Figure 2:
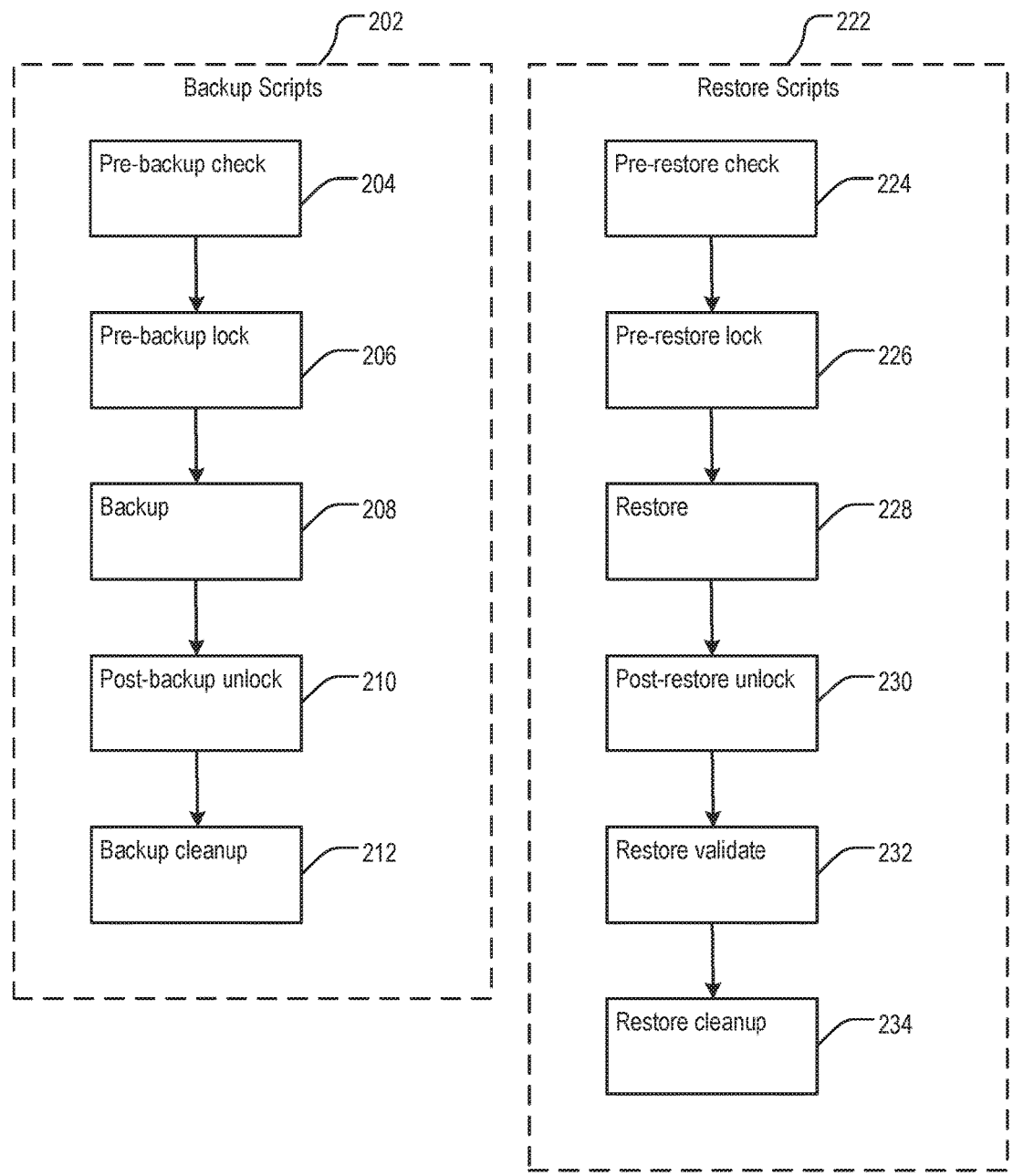
FIG. 2 is a block diagram illustrating example pre-defined order of backup and restore scripts.

FIG. 2 is a block diagram illustrating example pre-defined order of backup and restore scripts. A backup orchestrator, e.g., the backup orchestrator 102 of FIG. 1, provides lifecycle hooks for release authors to use. The lifecycle hooks define various stages of script execution for backup and restore. The stages are synchronized between deployment jobs. A release author can use the lifecycle hooks to coordinate backup and restore operations for multiple deployment jobs.

For backup scripts 202, the lifecycle hooks include stages of pre-backup check 204, pre-backup lock 206, backup 208, post-backup unlock 210 and post-backup cleanup 212. For restore scripts 222, the lifecycle hooks include stages of pre-restore check 224, pre-restore lock 226, restore 228, post-restore unlock 230, restore validate 232, and restore cleanup 234. The backup orchestrator can execute scripts linearly, following the order as indicated in FIG. 2.

The backup orchestrator can execute all scripts of a certain stage, e.g. pre-backup lock 206, serially for all jobs before executing scripts of a next stage, e.g. backup 208, to allow for consistency in a clustered deployment. For example, a pre-backup check 204 for a first deployment job will complete before the pre-backup check 204 for a second deployment job is started. The backup orchestrator may or may not control an order in which scripts of a particular stage are called between deployment jobs. The backup orchestrator does control an order scripts of different stages are called. In addition, in some implementations, the backup orchestrator may perform inter-deployment orchestrations to maintain cross-deployment consistency.

A deployment job can have a script that performs pre-backup check 204 that will check if the deployment job is backupable. This script allows the deployment job to check if the backup operation can be started. This script is optional, and need not be included if no pre-backup check is required. For example, when backing up MySQL, a script for pre-backup check 204 can determine whether the job can be locked.

To create a script for pre-backup check 204, a release author can store a shell script under any name in a templates directory of a deployment. In the templates section of a deployment job specification file, a release author can add the script name and the bin/pre-backup-check directory as a key value pair. The job specification file can be associated with a release. An example entry for a pre-backup check 204 script is shown below in Listing 1.

---
Listing 1
---
    name: a_node
    templates:
        pre-backup-check.erb: bin/pre-backup-check
---

The script for pre-backup check 204 uses an exit code to indicate a result. For example, exit code 0 (zero) can indicate success; any other exit code can indicate failure. Successful exit indicates that the deployment job is backupable. A script for pre-backup check 204 is called before any scripts for the pre-backup lock 206 are called on any nodes of the deployment. Scripts for pre-backup check 204 can be called in any order across jobs in the deployment.

Scripts for pre-backup check 204 can generate logs in the form of standard output streams and standard error streams, e.g., stdout and stderr streams. These streams will be captured and sent to a client device invoking the backup. The backup orchestrator can also store the logs in various directories. For example, stdout streams can be appended to a /var/vcap/sys/log/<job-name>/pre-backup-check.stdout.log file; stderr streams can be appended to a /var/vcap/sys/log/<job-name>/pre-backup-check.stderr.log file.

A deployment job can have a script for pre-backup lock 206 that will lock the deployment job that is determined to be backupable. This script allows the deployment job to lock so that backups are consistent across a cluster. For example, when backing up MySQL, a script for pre-backup lock 206 script can lock the job such that no migrations are running during the backup.

To add a backup-lock script to a deployment job, a release author can create a script with any name in the templates directory of the deployment job. The templates section of the deployment job specification file includes the script name and the bin/backup-lock directory as a key value pair. An example entry for a script for pre-backup lock 206 is shown below in Listing 2.

Listing 2 name: a_node
templates:
    backup-lock.erb: bin/backup-lock

The script for pre-backup lock 206 uses an exit code to indicate a result. For example, exit code 0 (zero) can indicate success; any other exit code can indicate failure. Successful exit indicates that the deployment job is successfully locked. A script for pre-backup lock 206 is called before any of the scripts for backup 208 are called on any nodes of the deployment. Scripts for pre-backup lock 206 can be called in any order across jobs in the deployment.

Scripts for pre-backup lock 206 can generate logs in the form of stdout and stderr streams. These streams will be captured and sent to the operator invoking the backup. The backup orchestrator can also store the logs in various directories. For example, stdout streams can be appended to a /var/vcap/sys/log/<job-name>/pre-backup-lock.stdout.log file; stderr streams can be appended to a /var/vcap/sys/log/<job-name>/pre-backup-lock.stderr.log file.

A deployment job can have a backup 208 script that will dump the backup of the deployment job to a specified directory, e.g., a directory specified by a $BACKUP_DIRECTORY parameter. For example, when backing up MySQL, the backup 208 script will invoke a data dump command, e.g., mysql dump. There is at least one backup 208 script in the deployment for the deployment to be backupable.

To add a backup script to a deployment job, a release author can create a script with any name in the templates directory of the deployment job. The templates section of the deployment job specification file includes the script name and the bin/backup directory as a key value pair. An example entry for a backup 208 script is shown below in Listing 3.

Listing 3 name: a_node
templates:
    backup.erb: bin/backup

The backup 208 script uses an exit code to indicate a result. For example, exit code 0 (zero) can indicate success; any other exit code can indicate failure. Successful exit indicates that the deployment job is successfully backed up. A backup 208 script is called after all of the pre-backup lock 206 scripts are called on all nodes of the deployment. A backup 208 script is called before any of the post-backup unlock 210 scripts are called on any nodes of the deployment. Backup 208 scripts can be called in any order across jobs in the deployment.

Backup 208 scripts can generate logs in the form of stdout and stderr streams. These streams will be captured and sent to the operator invoking the backup. The backup orchestrator can also store the logs in various directories. For example, stdout streams can be appended to a /var/vcap/sys/log/<job-name>/backup.stdout.log file; stderr streams can be appended to a /var/vcap/sys/log/<job-name>/backup.stderr.log file.

The post-backup unlock 210 and post-backup cleanup 212 scripts can have similar structures as disclosed above. Likewise, the restore scripts can have similar structures as well.

Figure 3:
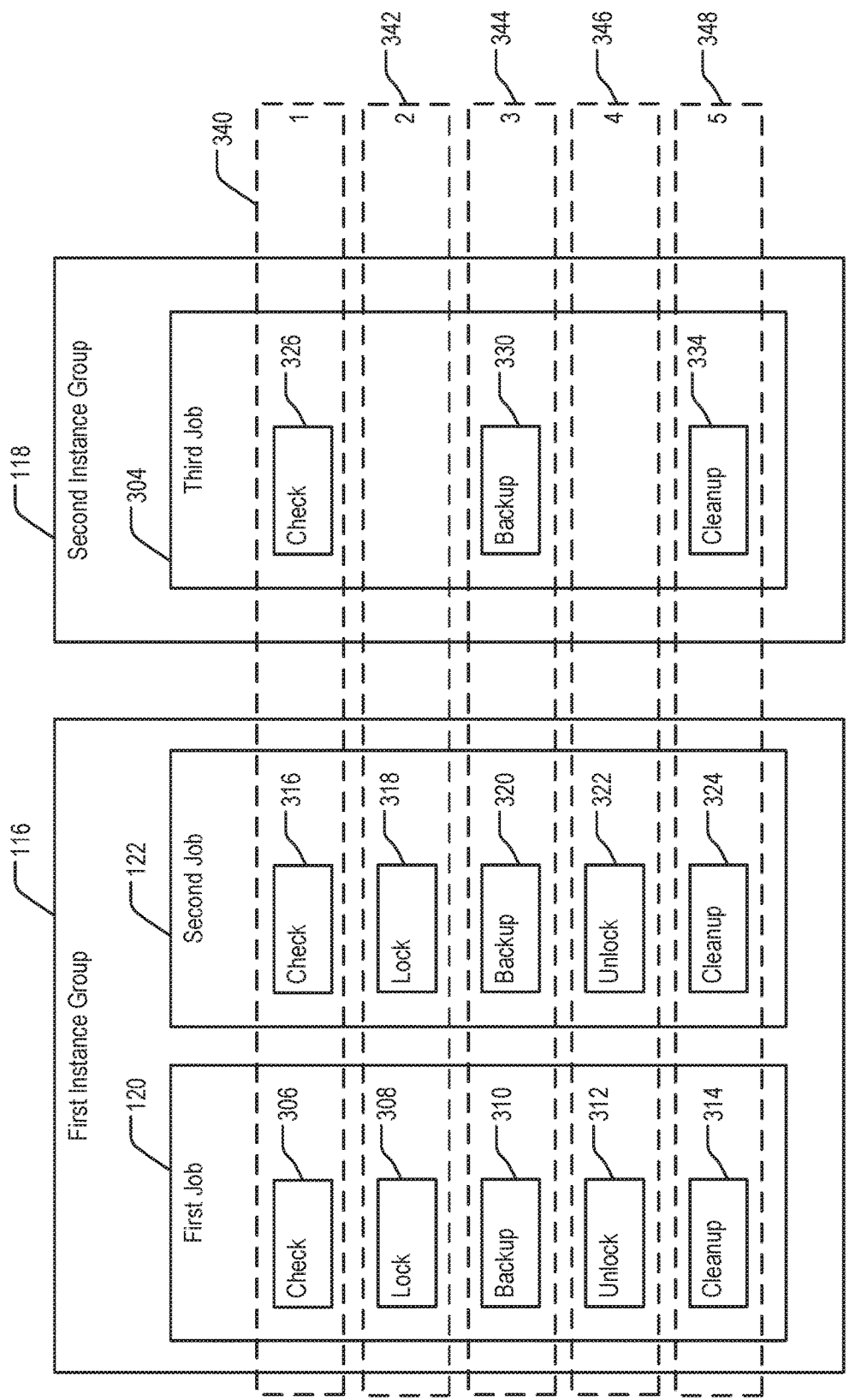
FIG. 3 is a diagram illustrating example orchestration of backup and restore scripts for multiple jobs.

FIG. 3 is diagram illustrating example orchestration of backup and restore scripts for multiple jobs. An example deployment, e.g., the deployment 110 of FIG. 1, can have multiple instance groups, e.g., a first instance group 116 and a second instance group 118. The first instance group 116 includes a first deployment job 120 and a second deployment job 122. The second instance group 118 includes a third deployment job 304.

The first deployment job 120 is associated with a first pre-backup check script 306, a first pre-backup lock script 308, a first backup script 310, a first post-backup unlock script 312, and a first post-backup cleanup script 314. The second deployment job 122 is associated with a second pre-backup check script 316, a second pre-backup lock script 318, a second backup script 320, a second post-backup unlock script 322, and a second post-backup cleanup script 324. The third deployment job 304 is associated with a third pre-backup check script 326, a third backup script 330 and a third post-backup cleanup script 334.

A backup orchestrator, e.g., the backup orchestrator 102 of FIG. 1, coordinates execution of these scripts 306-334. The backup orchestrator executes the scripts in stages. In a first stage 340, the backup orchestrator executes the first pre-backup check script 306, the second pre-backup check script 316, and the third pre-backup check script 326, not necessarily in that order. After executing these scripts, the backup orchestrator moves to a second stage 342. In the second stage 342, the backup orchestrator executes the first pre-backup lock script 308 and the second pre-backup lock script 318. In the example shown, the third deployment job 304 does not have a pre-backup lock script. After executing these scripts, the backup orchestrator moves to a third stage 344 to execute the backup scripts 310, 320 and 330. Following the execution of the backup scripts 310, 320 and 330, the backup orchestrator moves to the fourth stage 346 to execute the post-backup unlock scripts 312 and 322. Finally, the backup orchestrator moves to the fifth stage 348 to execute the post-backup cleanup scripts 414, 324 and 334. Each move occurs after all scripts in a previous stage complete execution.

For convenience, only scripts related to backing up a deployment are shown in FIG. 3. Execution of scripts related to restoring a deployment can be grouped and staged similarly.

Figure 4:
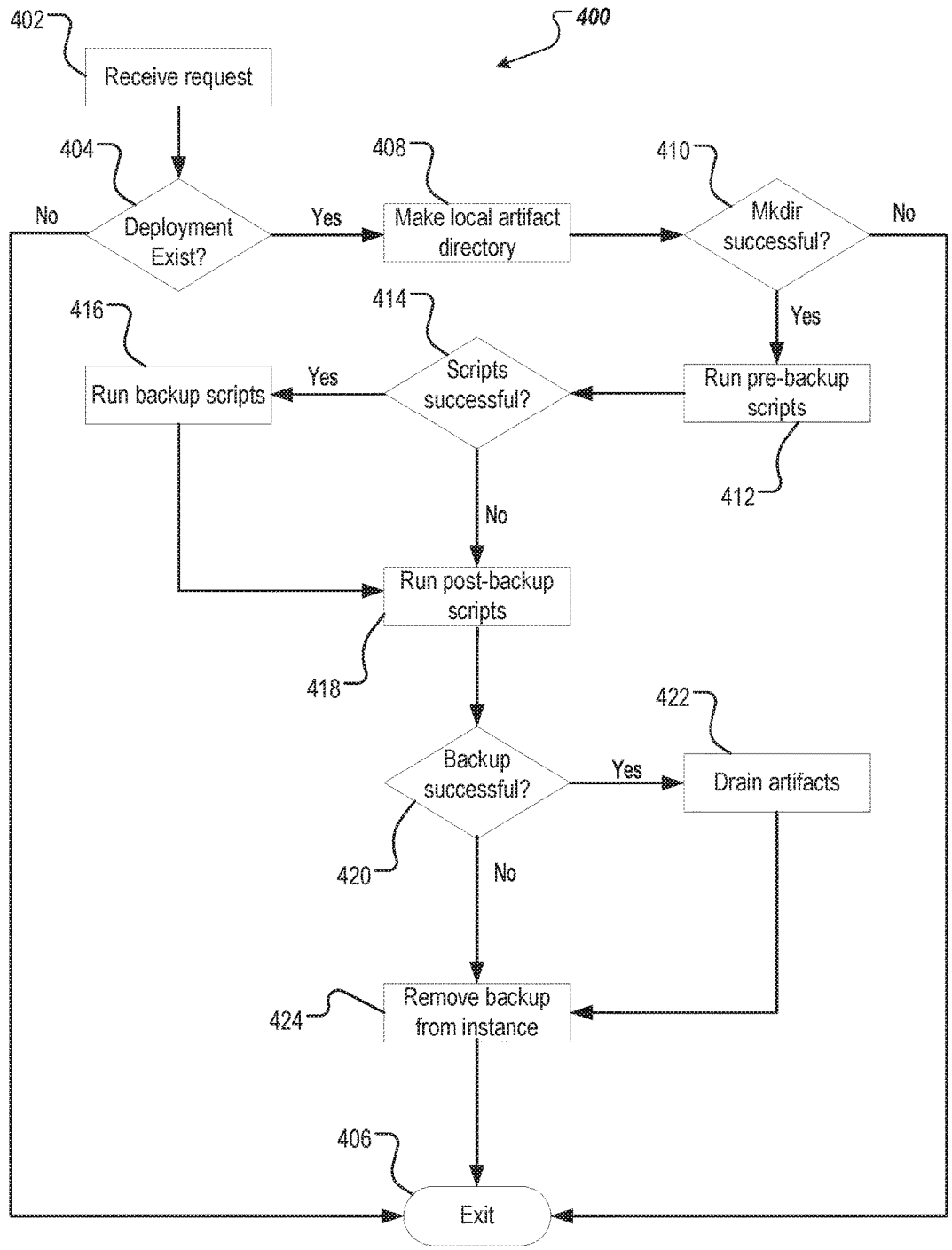
FIG. 4 is a flowchart illustrating an example process of script execution in a backup process.

FIG. 4 is a flowchart illustrating an example process 400 of script execution in a backup. The process 400 can be performed by a system including one or more processors, e.g., the backup orchestrator 102 of FIG. 1.

The system receives (402) a request to backup or restore a deployment. The request can specify a deployment by providing a location or name of the deployment. The system determines (404) whether specified deployment exists. In response to determining that the deployment does not exist, the system exits (406) the backup. In response to determining that the deployment does exist, the system creates (408) a local directory for storing backup artifacts, e.g., by executing a mkdir command.

The system determines (410) whether the local directory was created successfully. In response to determining that creating the local directory is unsuccessful, the system exits (406) the backup. In response to determining that creating the local directory is successful, the system executes (412) pre-backup scripts for deployment jobs in the deployment. The pre-backup scripts can include scripts for pre-backup check and pre-back lock. The system can execute the pre-backup scripts in groups and stages as described in reference to FIG. 3.

The system determines (414) whether executing the pre-backup scripts was successful. In response to determining that executing the pre-backup scripts was successful, the system executes (416) backup scripts to dump data of the deployment jobs. The system then executes (418) post-backup scripts. If the system determines that executing the pre-backup scripts was unsuccessful, the system can skip the backup scripts and execute the post-backup scripts. The post-backup scripts can include scripts for post-backup unlock and post-back cleanup. The system can execute the post-backup scripts in groups and stages as described in reference to FIG. 3.

The system determines (420) that the backup was successful. In response to determining that the backup was successful, the system drains (422) the artifacts. The artifacts are drained off from the deployed instance, so that the time taken to copy the backup is not included in the time the job is locked. The system then removes (424) the backup from the instance. Removing the backup includes deleting the copy of the backup from the deployed instance, now that the backup has been copied to the operators VM. In response to determining that the backup was unsuccessful, the system skips draining the artifacts. The system removes (424) the backup from the instance. The system then exits (406) the backup.

The process 400 is a process to back up a deployment. A process to restore a deployment can include similar operations.

Figure 5:
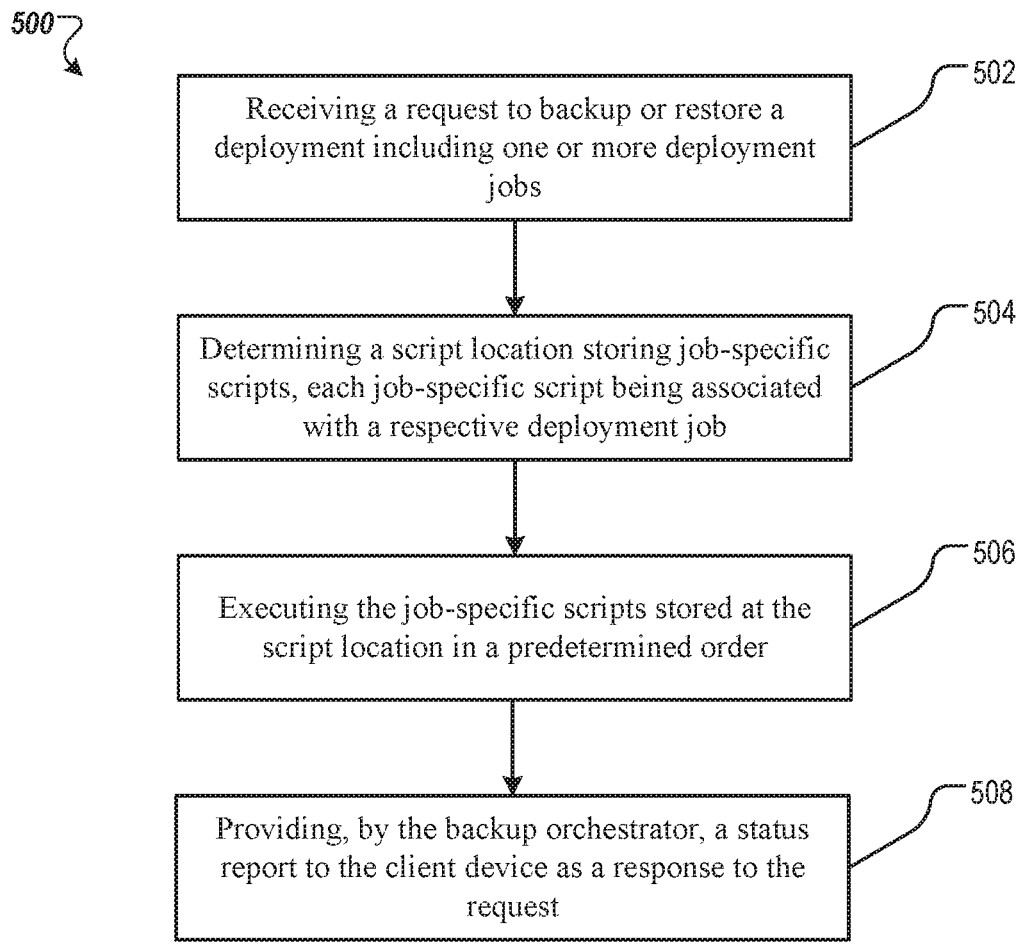
FIG. 5 is a flowchart illustrating an example process of backing up or restoring a deployment.

FIG. 5 is a flowchart illustrating an example process 500 of backing up or restoring a deployment. The process 500 can be performed by a system including one or more processors, e.g., the backup orchestrator 102 of FIG. 1.

The system receives (502), from a client device, a request to backup or restore a deployment. The deployment includes one or more deployment jobs. The deployment is implemented on a collection of virtual machines and a collection of one or more non-transitory storage devices, e.g., persistent disks. Each deployment job executes in a respective virtual machine. Each deployment job is defined in a deployment manifest. The request can be a command line input launching a backup orchestrator program. The request is associated with a deployment identifier identifying the deployment. The deployment identifier can specify a name or a location of the deployment. The deployment identifier may be a parameter of the request, or implicitly associated with the client device issuing the request.

The system determines (504), based on the deployment identifier, a script location storing job-specific scripts. Determining the script location includes identifying the script location as specified in the job specification files, e.g., as an entry shown in Listings 1-3 above. Each job-specific script is associated with a respective deployment job according to the deployment manifest and one or more job specification files. The deployment manifest and one or more job specification files can specify configuration parameters of the deployment.

For each job, the deployment manifest and one or more job specification files can specify one or more of a respective pre-backup script, e.g., a pre-backup check script and a pre-backup lock script; a respective backup script; one or more respective post-backup scripts, e.g., a post-backup unlock script and a post-backup cleanup script; one or more respective pre-restore scripts, e.g., a pre-restore check script and a pre-restore lock script; a respective restore script; or one or more respective post-restore scripts, e.g., a post-restore unlock script, a post-restore validation script, and a post-restore cleanup script. Content of the scripts, and action to be performed by the scripts, are user definable, and can be edited by a release author. The system thus provides a framework that is flexible and adaptable to different needs of different deployments. The deployment manifest and one or more job specification files can specify the respective scripts by specifying respective locations, e.g., directories or other forms of access paths, of the respective scripts.

The system executes (506) the job-specific scripts stored at the script location in a predetermined order. During execution, the system executes pre-backup or pre-restore scripts for each deployment job. The system then executes backup or restore scripts for each deployment job. The system then executes post-backup or post-restore scripts for each deployment job. Executing the job-specific scripts stored at the script location in the predetermined order includes executing the job-specific scripts serially by script type, each script type corresponding to a stage. During the execution, second type scripts execute after first type scripts are completed for all deployment jobs. For each script type, the job-specific scripts having that script type execute serially for each deployment job. In particular, for example, the execution order is described above in reference to FIG. 3. The job-specific scripts back up the one or more deployment jobs or restore the one or more deployment jobs.

The system provides (508) a status report to the client device as a response to the request, the status report indicating a state of the backup or restore. The status report can be standard input/output and error streams, or can be stored at specified locations and appended when new backup and restore occur. The state can include a code for success or an error code for failure.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
   receiving, from a client device by a backup orchestrator comprising one or more computer processors, a request to perform a backup or restore process for a deployment including a plurality of different deployment jobs, the request being associated with a deployment identifier identifying the deployment;
   determining, by the backup orchestrator and based on the deployment identifier, a script location storing job-specific scripts, each job-specific script being associated with a respective deployment job according to a specification file that specifies configuration parameters of the deployment;
   executing the job-specific scripts stored at the script location in a plurality of stages, including:
      executing first stage-specific scripts for a first stage for all of the plurality of deployment jobs, the first stage-specific scripts comprising respective pre-backup or pre-restore scripts for each deployment job of the plurality of different deployment jobs,
      after all first stage-specific scripts for the first stage have completed for all of the plurality of different deployment jobs, executing second stage-specific scripts for a second stage for all of the plurality of different deployment jobs, the second stage-specific scripts comprising respective backup or restore scripts for each deployment job of the plurality of different deployment jobs,
      after all second stage-specific scripts for the second stage have completed for all of the plurality of different deployment jobs, executing third stage-specific scripts for a third stage for all of the plurality of different deployment jobs, the third stage-specific scripts comprising respective post-backup or post-restore scripts for each deployment job of the plurality of different deployment jobs; and
   providing, by the backup orchestrator, a notification to the client device as a response to the request, the notification indicating a state of the backup or restore process.

2. The method of claim 1, wherein:
   the deployment is implemented on a collection of virtual machines and a collection of persistent disks,
   each deployment job executes in a respective virtual machine, and
   each deployment job is defined in the specification file.

3. The method of claim 1, wherein determining the script location comprises identifying the script location as specified in the specification file.

4. The method of claim 1, wherein the specification file defines, for each job, one or more of:
   a respective pre-backup script;
   a respective backup script;
   a respective post-backup script;
   a respective pre-restore script;
   a respective restore script; or
   a respective post-restore script.

5. The method of claim 4, wherein the specification file defines the respective scripts by specifying respective locations of the respective scripts.

6. The method of claim 1, wherein:
   the pre-backup or pre-restore scripts includes scripts for locking one or more jobs, and
   the post-backup or post-restore scripts includes scripts for unlocking one or more jobs.

7. The method of claim 1, wherein for each script type, the job-specific scripts having that script type execute serially for each deployment job.

8. The method of claim 1, wherein executing stage-specific scripts for a particular stage for all of the plurality of deployment jobs comprises executing the stage-specific scripts in serial across the plurality of deployment jobs.

9. A system comprising:
   a backup orchestrator comprising one or more computers; and
   one or more storage devices on which are stored instructions that are operable, when executed by the one or more computers, to cause the one or more computers to perform operations comprising:
      receiving, from a client device, a request to perform a backup or restore process for a deployment including a plurality of different deployment jobs, the request being associated with a deployment identifier identifying the deployment;
      determining, based on the deployment identifier, a script location storing job-specific scripts, each job-specific script being associated with a respective deployment job according to a specification file that specifies configuration parameters of the deployment;
      executing the job-specific scripts stored at the script location in a plurality of stages, including:
         executing first stage-specific scripts for a first stage for all of the plurality of deployment jobs, the first stage-specific scripts comprising respective pre-backup or pre-restore scripts for each deployment job of the plurality of different deployment jobs,
         after all first stage-specific scripts for the first stage have completed for all of the plurality of different deployment jobs, executing second stage-specific scripts for a second stage for all of the plurality of different deployment jobs, the second stage-specific scripts comprising respective backup or restore scripts for each deployment job of the plurality of different deployment jobs,
         after all second stage-specific scripts for the second stage have completed for all of the plurality of different deployment jobs, executing third stage-specific scripts for a third stage for all of the plurality of different deployment jobs, the third stage-specific scripts comprising respective post-backup or post-restore scripts for each deployment job of the plurality of different deployment jobs; and providing a notification to the client device as a response to the request, the notification indicating a state of the backup or restore process.

10. The system of claim 9, wherein:
the deployment is implemented on a collection of virtual machines and a collection of persistent disks,
each deployment job executes in a respective virtual machine, and
each deployment job is defined in the specification file.

11. The method of claim 9, wherein determining the script location comprises identifying the script location as specified in the specification file.

12. The system of claim 9, wherein the specification file defines, for each job, one or more of:
a respective pre-backup script;
a respective backup script;
a respective post-backup script;
a respective pre-restore script;
a respective restore script; or
a respective post-restore script.

13. The system of claim 12, wherein the specification file defines the respective scripts by specifying respective locations of the respective scripts.

14. The system of claim 9, wherein:
the pre-backup or pre-restore scripts includes scripts for locking one or more jobs, and
the post-backup or post-restore scripts includes scripts for unlocking one or more jobs.

15. The system of claim 9, wherein for each script type, the job-specific scripts having that script type execute serially for each deployment job.

16. One or more non-transitory storage devices storing instructions that are operable, when executed by one or more computers, to cause the one or more computers to perform operations comprising:
receiving, from a client device by a backup orchestrator comprising one or more computer processors, a request to perform a backup or restore process for a deployment including a plurality of different deployment jobs, the request being associated with a deployment identifier identifying the deployment;
determining, by the backup orchestrator and based on the deployment identifier, a script location storing job-specific scripts, each job-specific script being associated with a respective deployment job according to a specification file that specifies configuration parameters of the deployment;
executing the job-specific scripts stored at the script location in a plurality of stages, including:
executing first stage-specific scripts for a first stage for all of the plurality of deployment jobs, the first stage-specific scripts comprising respective pre-backup or pre-restore scripts for each deployment job of the plurality of different deployment jobs,
after all first stage-specific scripts for the first stage have completed for all of the plurality of different deployment jobs, executing second stage-specific scripts for a second stage for all of the plurality of different deployment jobs, the second stage-specific scripts comprising respective backup or restore scripts for each deployment job of the plurality of different deployment jobs,
after all second stage-specific scripts for the second stage have completed for all of the plurality of different deployment jobs, executing third stage-specific scripts for a third stage for all of the plurality of different deployment jobs, the third stage-specific scripts comprising respective post-backup or post-restore scripts for each deployment job of the plurality of different deployment jobs; and
providing, by the backup orchestrator, a notification to the client device as a response to the request, the notification indicating a state of the backup or restore process.

17. The one or more non-transitory storage devices of claim 16, wherein:
the deployment is implemented on a collection of virtual machines and a collection of persistent disks,
each deployment job executes in a respective virtual machine, and
each deployment job is defined in the specification file.

18. The one or more non-transitory storage devices of claim 16, wherein determining the script location comprises identifying the script location as specified in the specification file.

19. The one or more non-transitory storage devices of claim 16, wherein the specification file defines, for each job, one or more of:
a respective pre-backup script;
a respective backup script;
a respective post-backup script;
a respective pre-restore script;
a respective restore script; or
a respective post-restore script.

* * * * *